(12) United States Patent
Edelmann et al.

(10) Patent No.: US 9,012,538 B2
(45) Date of Patent: Apr. 21, 2015

(54) SILANE-CONTAINING BINDER FOR COMPOSITE MATERIALS

(75) Inventors: Roland Edelmann, Rheinfelden (DE); Burkhard Standke, Loerrach (DE); Peter Jenkner, Wesel (DE); Alireza Kharazipour, Goettingen (DE); Lars Kloeser, Goettingen (DE); Jaroslaw Monkiewicz, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 11/995,751

(22) PCT Filed: Jun. 14, 2006

(86) PCT No.: PCT/EP2006/063205
§ 371 (c)(1),
(2), (4) Date: Jan. 15, 2008

(87) PCT Pub. No.: WO2007/023008
PCT Pub. Date: Mar. 1, 2007

(65) Prior Publication Data
US 2008/0206572 A1    Aug. 28, 2008

(30) Foreign Application Priority Data

Aug. 26, 2005  (DE) .......................... 10 2005 040 681
Feb. 14, 2006  (DE) .......................... 10 2006 006 656

(51) Int. Cl.
| B29C 47/00 | (2006.01) |
| C09J 161/00 | (2006.01) |
| C09J 193/00 | (2006.01) |
| C08J 5/04 | (2006.01) |
| C08K 5/544 | (2006.01) |
| C08L 61/20 | (2006.01) |
| C08L 97/02 | (2006.01) |
| C09J 161/06 | (2006.01) |
| C09J 161/24 | (2006.01) |
| C09J 161/28 | (2006.01) |
| C09J 189/00 | (2006.01) |

(52) U.S. Cl.
CPC .............. *C09J 161/00* (2013.01); *C09J 193/00* (2013.01); *C08J 5/045* (2013.01); *C08J 2361/06* (2013.01); *C08K 5/544* (2013.01); *C08L 61/20* (2013.01); *C08L 97/02* (2013.01); *C09J 161/06* (2013.01); *C09J 161/24* (2013.01); *C09J 161/28* (2013.01); *C09J 189/00* (2013.01)

(58) Field of Classification Search
USPC ........................................................ 524/13
See application file for complete search history.

(56) References Cited

U.S. PATENT DOCUMENTS

| 3,331,885 | A |   | 7/1967 | Rider et al. | |
| 4,095,010 | A |   | 6/1978 | Zellar et al. | |
| 4,317,765 | A | * | 3/1982 | Gaylord | 523/204 |
| 4,340,524 | A | * | 7/1982 | Bullman | 524/297 |
| 4,478,966 | A | * | 10/1984 | Helgesson et al. | 524/13 |
| 4,717,742 | A | * | 1/1988 | Beshay | 523/203 |
| 4,820,749 | A | * | 4/1989 | Beshay | 523/203 |
| 5,075,414 | A | * | 12/1991 | Dailey, Jr. | 528/129 |
| 5,354,832 | A | * | 10/1994 | Chang et al. | 528/10 |
| 5,459,182 | A | * | 10/1995 | Peeters et al. | 524/114 |
| 5,554,686 | A | * | 9/1996 | Frisch et al. | 524/588 |
| 5,629,400 | A |   | 5/1997 | Standke et al. | |
| 5,679,147 | A |   | 10/1997 | Standke et al. | |
| 5,808,125 | A |   | 9/1998 | Standke et al. | |
| 5,849,942 | A |   | 12/1998 | Standke et al. | |
| 5,863,509 | A |   | 1/1999 | Standke et al. | |
| 5,885,341 | A |   | 3/1999 | Standke et al. | |
| 6,054,601 | A |   | 4/2000 | Standke et al. | |
| 6,176,918 | B1 |   | 1/2001 | Glausch et al. | |
| 6,177,582 | B1 |   | 1/2001 | Jenkner et al. | |
| 6,228,936 | B1 |   | 5/2001 | Standke et al. | |
| 6,239,194 | B1 |   | 5/2001 | Standke et al. | |
| 6,251,989 | B1 |   | 6/2001 | Edelmann et al. | |
| 6,255,513 | B1 |   | 7/2001 | Standke et al. | |
| 6,288,198 | B1 | * | 9/2001 | Mechtel et al. | 528/28 |
| 6,288,256 | B1 |   | 9/2001 | Standke et al. | |
| 6,361,871 | B1 |   | 3/2002 | Jenkner et al. | |
| 6,403,228 | B1 |   | 6/2002 | Mack et al. | |
| 6,482,523 | B1 | * | 11/2002 | Morikawa et al. | 428/423.1 |

(Continued)

FOREIGN PATENT DOCUMENTS

| AU | 751731 | 8/2002 |
| EP | 0 613 905 A1 | 9/1994 |

(Continued)

OTHER PUBLICATIONS

Matuana et al. (Wood Composites, Encyclopedia of Polymer Science and Technology, vol. 12, John Wiley and Sons, 521-546, 2004).*
Mayer (Polymer Degradation and Stability, 59, 1998, 231-235).*
U.S. Appl. No. 11/572,555, filed Jan. 23, 2007, Just, et al.
U.S. Appl. No. 11/572,688, filed Jan. 25, 2007, Edelmann, et al.
U.S. Appl. No. 11/576,504, filed Apr. 2, 2007, Mueh, et al.
U.S. Appl. No. 11/995,215, filed Jan. 10, 2008, Jenkner, et al.
U.S. Appl. No. 11/995,550, filed Jan. 14, 2008, Edelmann, et al.
U.S. Appl. No. 12/159,785, filed Jul. 1, 2008, Standke, et al.
U.S. Appl. No. 12/181,629, filed Sep. 4, 2008, Militz, et al.
U.S. Appl. No. 12/673,390, filed Feb. 16, 2010, Wassmer, et al.
U.S. Appl. No. 12/674,271, filed Feb. 19, 2010, Albert, et al.

(Continued)

*Primary Examiner* — Liam J Heincer
(74) *Attorney, Agent, or Firm* — Oblon, McClelland, Maier & Neustadt, L.L.P.

(57) ABSTRACT

The present invention relates to a binder for composite materials comprising cellulose- or lignocellulose-containing materials, which is based on the components (i) at least one binder from the series consisting of organic resins, isocyanates, natural or near-natural binders and (ii) at least one composition based on an aminoalkylsilane. The invention furthermore relates to a composite material which is at least based on a cellulose- or lignocellulose-containing material and the abovementioned binder, a process for the production of such a composite material and the use of the binder system according to the invention for the production of wood-based materials.

9 Claims, No Drawings

(56) References Cited

U.S. PATENT DOCUMENTS

| | | | |
|---|---|---|---|
| 6,491,838 B1 | 12/2002 | Standke et al. | |
| 6,500,883 B1 | 12/2002 | Mack et al. | |
| 6,534,667 B1 | 3/2003 | Standke et al. | |
| 6,641,870 B2 | 11/2003 | Bartkowiak et al. | |
| 6,649,084 B2 * | 11/2003 | Morikawa et al. | 252/182.22 |
| 6,663,683 B2 | 12/2003 | Lortz et al. | |
| 6,676,719 B2 | 1/2004 | Lortz et al. | |
| 6,685,766 B2 | 2/2004 | Standke et al. | |
| 6,695,904 B2 | 2/2004 | Burger et al. | |
| 6,713,186 B1 | 3/2004 | Jenkner et al. | |
| 6,767,377 B2 | 7/2004 | Schumacher et al. | |
| 6,770,327 B2 | 8/2004 | Edelmann et al. | |
| 6,773,697 B2 | 8/2004 | Hemme et al. | |
| 6,773,814 B2 | 8/2004 | Schumacher et al. | |
| 6,808,769 B2 | 10/2004 | Batz-Sohn et al. | |
| 6,811,825 B1 * | 11/2004 | Bosch et al. | 427/407.1 |
| 6,841,197 B2 | 1/2005 | Standke et al. | |
| 6,905,632 B2 | 6/2005 | Lortz et al. | |
| 6,991,190 B2 | 1/2006 | Lortz et al. | |
| 7,015,270 B2 | 3/2006 | Scharfe et al. | |
| 7,026,398 B2 | 4/2006 | Monkiewicz et al. | |
| 7,083,769 B2 | 8/2006 | Moerters et al. | |
| 7,244,302 B2 | 7/2007 | Schumacher et al. | |
| 7,255,735 B2 | 8/2007 | Meyer et al. | |
| 7,374,787 B2 | 5/2008 | Lortz et al. | |
| 7,399,487 B2 | 7/2008 | Batz-Sohn et al. | |
| 7,427,442 B2 | 9/2008 | Albert et al. | |
| 7,470,423 B2 | 12/2008 | Lortz et al. | |
| 7,538,142 B2 | 5/2009 | Lortz et al. | |
| 7,572,854 B2 | 8/2009 | Schneider et al. | |
| 7,578,877 B2 | 8/2009 | Giessler et al. | |
| 7,611,753 B2 | 11/2009 | Bartkowiak et al. | |
| 7,615,577 B2 | 11/2009 | Lortz et al. | |
| 7,645,335 B2 | 1/2010 | Lortz et al. | |
| 7,666,257 B2 | 2/2010 | Giessler-Blank et al. | |
| 7,670,422 B2 | 3/2010 | Giessler-Blank et al. | |
| 7,749,322 B2 | 7/2010 | Schumacher et al. | |
| 7,780,777 B2 | 8/2010 | Perlet et al. | |
| 7,815,936 B2 | 10/2010 | Hasenzahl et al. | |
| 7,834,073 B2 | 11/2010 | Standke et al. | |
| 7,976,719 B2 | 7/2011 | Batz-Sohn et al. | |
| 8,012,367 B2 | 9/2011 | Hasenzahl et al. | |
| 2002/0142169 A1 * | 10/2002 | Hofacker et al. | 428/423.1 |
| 2002/0197311 A1 | 12/2002 | Hasenzahl et al. | |
| 2003/0108580 A1 | 6/2003 | Hasenzahl et al. | |
| 2003/0173026 A1 * | 9/2003 | Wu et al. | 156/329 |
| 2003/0228271 A1 | 12/2003 | Batz-Sohn et al. | |
| 2004/0062920 A1 * | 4/2004 | Guilbert et al. | 428/295.1 |
| 2004/0072924 A1 * | 4/2004 | Sigworth et al. | 523/200 |
| 2004/0113117 A1 * | 6/2004 | Matsumura et al. | 252/8.62 |
| 2004/0236008 A1 * | 11/2004 | Laubender et al. | 524/556 |
| 2004/0240062 A1 | 12/2004 | Lortz et al. | |
| 2005/0004327 A1 * | 1/2005 | Ueda et al. | 525/477 |
| 2005/0137323 A1 * | 6/2005 | Roesler et al. | 524/589 |
| 2005/0169861 A1 | 8/2005 | Lortz et al. | |
| 2005/0176913 A1 | 8/2005 | Gillis et al. | |
| 2005/0265934 A1 | 12/2005 | Schumacher et al. | |
| 2006/0084718 A1 * | 4/2006 | Stancliffe et al. | 523/139 |
| 2006/0104881 A1 | 5/2006 | Lortz et al. | |
| 2006/0159635 A1 | 7/2006 | Meyer et al. | |
| 2006/0159636 A1 | 7/2006 | Meyer et al. | |
| 2006/0159637 A1 | 7/2006 | Meyer et al. | |
| 2006/0163533 A1 | 7/2006 | Batz-Sohn et al. | |
| 2006/0205868 A1 * | 9/2006 | Gordon et al. | 524/588 |
| 2006/0229210 A1 | 10/2006 | Neugebauer et al. | |
| 2006/0292192 A1 | 12/2006 | Hasenzahl et al. | |
| 2006/0293418 A1 * | 12/2006 | Matuana et al. | 524/13 |
| 2007/0054056 A1 | 3/2007 | Albert et al. | |
| 2007/0110906 A1 | 5/2007 | Edelmann et al. | |
| 2007/0110912 A1 | 5/2007 | Standke | |
| 2007/0208110 A1 * | 9/2007 | Sigworth et al. | 524/13 |
| 2007/0231280 A1 | 10/2007 | Schumacher et al. | |
| 2007/0293604 A1 * | 12/2007 | Frenkel et al. | 524/13 |
| 2007/0297998 A1 | 12/2007 | Meyer et al. | |
| 2008/0027161 A1 | 1/2008 | Schlosser et al. | |
| 2008/0058489 A1 | 3/2008 | Edelmann et al. | |
| 2008/0095724 A1 | 4/2008 | Hasenzahl et al. | |
| 2008/0125529 A1 * | 5/2008 | Austermann et al. | 524/266 |
| 2008/0187673 A1 | 8/2008 | Standke et al. | |
| 2008/0188617 A1 | 8/2008 | Standke et al. | |
| 2008/0213325 A1 | 9/2008 | Schumacher et al. | |
| 2008/0233341 A1 * | 9/2008 | Jenkner et al. | 428/113 |
| 2008/0249237 A1 | 10/2008 | Hager et al. | |
| 2008/0264299 A1 | 10/2008 | Lortz et al. | |
| 2009/0047225 A1 | 2/2009 | Hasenzahl et al. | |
| 2009/0069464 A1 | 3/2009 | Standke | |
| 2009/0131694 A1 | 5/2009 | Schumacher et al. | |
| 2009/0186053 A1 | 7/2009 | Meyer et al. | |
| 2009/0261309 A1 | 10/2009 | Lortz et al. | |
| 2010/0117021 A1 | 5/2010 | Batz-Sohn et al. | |
| 2010/0119851 A1 | 5/2010 | Giessler-Blank et al. | |
| 2010/0159144 A1 | 6/2010 | Standke et al. | |
| 2010/0209339 A1 | 8/2010 | Schumacher et al. | |
| 2010/0209719 A1 | 8/2010 | Borup et al. | |
| 2010/0233392 A1 | 9/2010 | Batz-Sohn et al. | |
| 2010/0308287 A1 | 12/2010 | Lortz et al. | |
| 2011/0124794 A1 | 5/2011 | Friedel et al. | |
| 2011/0144226 A1 | 6/2011 | Spyrou et al. | |
| 2011/0259240 A1 | 10/2011 | Jenkner et al. | |
| 2011/0308423 A1 | 12/2011 | Friedel et al. | |
| 2012/0031302 A1 | 2/2012 | Albert et al. | |
| 2012/0204762 A1 | 8/2012 | Albert et al. | |

FOREIGN PATENT DOCUMENTS

| | | |
|---|---|---|
| EP | 0 613 906 A1 | 9/1994 |
| EP | 0 671 437 | 9/1995 |
| EP | 0 721 001 | 7/1996 |
| EP | 1 010 678 A1 | 6/2000 |
| EP | 1 072 639 A1 | 1/2001 |
| EP | 1 362 904 | 11/2003 |
| GB | 907 302 | 10/1962 |
| GB | 1 293 744 | 10/1972 |
| GB | 1 316 911 | 5/1973 |
| JP | 2001-89868 | 4/2001 |
| WO | WO 96/32444 | 10/1996 |
| WO | WO 01/09214 A1 | 2/2001 |
| WO | 2004 046218 | 6/2004 |
| WO | 2004 083273 | 9/2004 |
| WO | WO 2007023007 A1 * | 3/2007 |

OTHER PUBLICATIONS

U.S. Appl. No. 13/257,488, filed Oct. 21, 2011, Standke, et al.
U.S. Appl. No. 13/256,557, Sep. 14, 2011, Scharfe, et al.
The Extended European Search Report issued May 13, 2013, in Application No. / Patent No. 13158023.5-1306.
The Extended European Search Report issued May 13, 2013, in Application No. / Patent No. 13158025.0-1306.
The Extended European Search Report issued May 13, 2013, in Application No. / Patent No. 13158026.8-1306.
The Extended European Search Report issued May 13, 2013, in Application No. / Patent No. 13158028.4-1306.
U.S. Appl. No. 13/580,194, filed Aug. 21, 2012, Borup, et al.
U.S. Appl. No. 13/638,702, filed Oct. 25, 2012, Friedel, et al.
U.S. Appl. No. 13/638,733, filed Oct. 1, 2012, Friedel, et al.
U.S. Appl. No. 13/638,734, filed Oct. 1, 2012, Friedel, et al.
U.S. Appl. No. 13/640,638, filed Oct. 11, 2012, Friedel, et al.
U.S. Appl. No. 13/638,619, filed Oct. 1, 2012, Friedel, et al.

* cited by examiner

SILANE-CONTAINING BINDER FOR COMPOSITE MATERIALS

The present invention relates to a special binder for composite materials based on cellulose- or lignocellulose-containing materials, composite materials based on the binder, a process for the preparation thereof and the use of the binder.

Organosilicon compounds are used in the form of various silanes, their reaction products or corresponding formulations in the production of composite materials, in particular those based on natural or near-natural fibers, i.e. cellulose- or lignocellulose-containing materials.

Wood-based materials comprise up to about 20% of binder and other additives. The most frequently used binder worldwide for wood-based materials is urea-formaldehyde resin (UF resin).

Wood-based materials glued with UF resin have, as a rule, a comparatively low heat and moisture resistance which prevents use for most special areas, for example for load-bearing and high-strength purposes and for the outdoor sector.

In addition to the UF resins, about 10% of phenol-formaldehyde resin (PF resin) are also used for the production of wood-based materials.

Organic isocyanates are used in a small proportion in the wood-based materials industry for materials having good mechanical and water-resistant properties. Diphenylmethane diisocyanate (PMDI) is mainly used. In contrast to the systems described above, the isocyanates form chemical compounds with the wood, demonstrably with lignin and cellulose.

However, the use of PMDI as a binder has a large number of disadvantages. From the point of view of application technology, the affinity to metal is a cause for complaint since PMDI-glued particles and fibers may adhere to the pressbelts during the hot pressing. For this reason, it is necessary to work with expensive, specially coated pressbelts.

In addition, stringent work safety measures have to be provided and complied with in the handling of PMDI.

Binders or binder systems for natural or near-natural wood-based materials, such as, for example, potato pulp (EP 0 613 906 A1, DE 43 06 441 A1, DE 43 40 517 A1, DE 434 518 A1), do not ensure an effect compliant with standards for every application.

DE 100 37 724 A1 discloses a process for the production of composite materials from organic substances using a binder based on hydrogen-, alkyl, alkenyl-, phenyl-, glycidyloxyalkyl-, acryloyloxyalkyl- and methacryloyloxyalkyl-functional siloxanes.

DE 196 47 369 A1 relates to composite materials based on glass fibers, mineral fibers or wood-based materials, the binder used being a so-called nanocomposite which is produced by the sol-gel process and is based, inter alia, on colloidal inorganic particles and one or more hydrolyzable organosilanes. The silanes used there may carry chloride, alkoxy, acetoxy, alkyl, alkenyl, aryl, glycidyloxyalkyl and methacryloyloxyalkyl groups as functional groups.

Furthermore, WO 98/22536 discloses composite materials based on plant materials, alkynyl, alkacryloyl and arylalkylene groups which may optionally also have one or more substituents, such as halogen, alkoxy, hydroxyl, amino or epoxide groups, being stated as possible radicals which cannot be hydrolytically eliminated, in addition to alkyl and alkenyl groups, over and above the recommendation of DE 196 47 369 A1 for the polysiloxane of the sol-gel system. In addition, according to WO 98/22536, pure methyltriethoxysilane or a mixture of methyltriethoxysilane and tetraethoxysilane can be used as a binder for the production of a composite material.

A substantial disadvantage of the abovementioned system is that hydrolyzable alkoxides are also used. These have a vapor pressure which is not negligible and moreover eliminate alcohol as a hydrolysis product. This leads in practice on the processing machines customary in particleboard works to a considerable odor annoyance and to a danger due to explosive vapors.

EP 0 716 127 B1 and EP 0 716 128 B1 disclose water-based aminoalkyl-/alkyl-/hydroxyl- or alkoxysiloxane-containing compositions which are used, inter alia, for imparting water repellency to textiles, leather, cellulose products and starch products. Such aminoalkylorganohydroxysiloxanes soluble in water or water/alcohol mixtures are also referred to as hydrosil systems. Fluoroalkyl-functional hydrosil systems are disclosed, for example, in EP 0846716 B1, EP 0846717 B1 and EP 1 101 787A2.

The object of the present invention was to provide cellulose- or lignocellulose-containing composite materials which are based on a further binder.

The object is achieved, according to the invention, in accordance with the information of the patent claims.

Thus, novel composite materials having substantially improved properties were surprisingly found, these being based on at least one cellulose- or lignocellulose-containing material and a binder and this binder in turn being based at least on the components (i) at least one binder from the series consisting of organic resins, isocyanates of natural or near-natural binders and (ii) at least one composition based on an aminoalkylsilane.

Such compositions advantageously contain, as component (ii), at least one aminoalkylsilane of the formula (I)

in which groups $R^1$ and $R^2$ are identical or different and in each case are H or a linear, branched or cyclic $C_1$- to $C_{20}$-alkyl group or an aryl group or an aminocarbyl group of the form $H_2N-(C=O)-$ (a resultant ureido group), $R^3$ is H or a linear or branched $C_1$- to $C_8$-alkyl group, groups $R^4$ are identical or different and $R^4$ is H or methyl, a is from 1 to 10, preferably 3, groups R are identical or different and R is H or a linear or branched $C_1$- to $C_8$-alkyl group and r is 0 or 1 or 2, it being possible for groups $R^1$ and $R^2$ to be optionally substituted and preferred substituents being halogens from the series F, Cl, Br and I or silyl groups of the form $-(CHR^{4'})_a Si(R^{3'})_{r'}(OR')_{3-r'}$ or aminoalkyl groups of the form $-(CHR^{4'})_a NR^{1'}R^{2'}$, for example

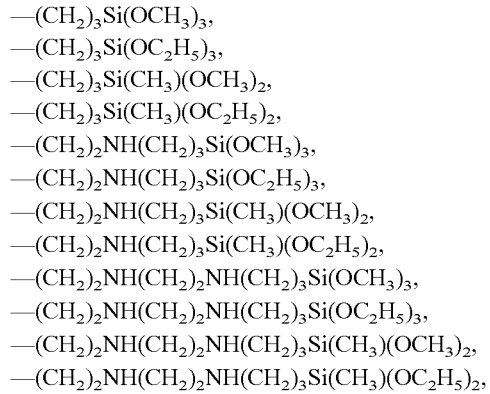

and branched aminoalkyl-functional groups, such as

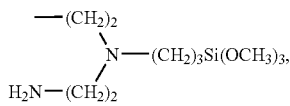

to mention but a few examples in each case, a' is from 1 to 10 and r' is 0 or 1 or 2 and R', $R^{1'}$, $R^{2'}$, $R^{3'}$, $R^{4'}$ have the same meaning as the corresponding groups R, $R^1$, $R^2$, $R^3$ and $R^4$ each already referred to above, or at least one cocondensate of at least one aminoalkylsilane of the general formula (I) and at least one further functional silane of the general formula (II)

in which $R^7$ is H or a vinyl group or an amino group or a glycidyloxy group or an acryloyloxy group or a methacryloyloxy group or a mercapto group or a sulfane group or a linear or branched $C_1$- to $C_{20}$-alkyl group or an aryl group, it being possible for the group $R^7$ to be optionally substituted, groups $R^6$ are identical or different and $R^6$ is H or methyl, b is from 0 to 18, preferably 0, 1, 2, 3, 4, 8, 16 or 18, $R^5$ is H or a linear or branched $C_1$- to $C_8$-alkyl group, groups R are identical or different and R is H or a linear or branched $C_1$- to $C_8$-alkyl group and p is 0 or 1 or 2, it being possible for the amino functions in the cocondensate to be partly or completely neutralized with an inorganic or organic acid (also referred to below as HX or $H_nX$ where n=1, 2 or 3), X preferably being $F^-$, $Cl^-$, $Br^-$, $I^-$, $NO_3^-$, $HSO_4^-$, $SO_4^{2-}$, $H_2PO_4^-$, $HPO_4^{2-}$, $PO_4^{3-}$, $HCOO^-$ or $CH_3COO^-$, or an aqueous solution which in turn contains at least one aminoalkylsilane of the formula (I) or at least one cocondensate based on at least one aminoalkylsilane of the general formula (I) and at least one further functional silane of the general formula (II).

Said cocondensates based on at least one aminoalkylsilane of the formula (I) and at least one further functional silane of the formula (II) are understood as a rule as meaning those compounds as may be represented according to general chemical understanding by the general formula (III)

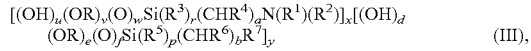

in which the groups R, $R^1$, $R^2$, $R^3$, $R^4$, $R^5$, $R^6$ and $R^7$ and a and b correspond to the meaning according to that in the formulae (I) and (II) and u may be from 0 to 3, v may be from 0 to 3, w may be from 0 to 1.5, d may be from 0 to 3, e may be from 0 to 3, f may be from 0 to 1.5, x may be from 1 to 1000, y may be from 0 to 1000, r may be 0 or 1 or 2 and p may be 0 or 1 or 2, with the provisos that (u+v+2w)=(3−r) and (d+e+2f)=(3−p) and (x+y) is from 1 to 2000, preferably from 2 to 1000, particularly preferably from 3 to 500, very particularly preferably from 4 to 100, in particular (x+y) is from 5 to 50.

Thus, one or more different aminosilanes can be subjected to cocondensation with one or more different functional silanes. Furthermore, said cocondensates may also be block copolymers and those having a random distribution.

In addition, composite materials according to the invention are obtainable in a simple and economical manner by treating dried or moist cellulose- or lignocellulose-containing material with a binder which is based at least on the components (i) and (ii), and bringing the cellulose or lignocellulose material thus treated into a desired form and then hot-pressing it.

In addition, binders according to the invention can advantageously contain further components, such as, for example, paraffin- or wax-based water repellents, flameproofing agents, e.g. polyphosphates and biocidal substances and fragrances—to mention but a few.

According to the invention, it is also possible to use aqueous binders which have been rendered acidic, with the result that a curing solution as a further additive can advantageously be dispensed with.

Composite materials according to the invention are advantageously distinguished as a rule by a substantially improved transverse tensile strength, flexural strength and considerably improved swelling behavior compared with many composite materials to date.

Thus, the mechanical-technological properties of wood-based materials produced can be enhanced by using the binder according to the invention.

Furthermore, the use of the novel binder systems creates the possibility of omitting conventional binders while obtaining identical or improved mechanical-technological properties, since, owing to the advantageous Theological properties of binders according to the invention, the amount of binder used can advantageously be reduced and hence the solids content substantially increased, in particular in the case of formaldehyde-containing binder systems. In addition, the reduction of the binder content in the press material advantageously leads to a shortening of the press time and hence to a further substantial economic advantage.

Furthermore, the use of a novel binder system based on a natural or near-natural binder as component (i) and of a component (ii) permits for the first time the production of composite materials based on cellulose or lignocellulose, which comply with the European standard (EN 622-5).

The present invention therefore relates to a binder for composite materials comprising cellulose- or lignocellulose-containing material which is based at least on the components (i) at least one binder from the series consisting of organic resins, isocyanates (PMDI), natural or near-natural binders and (ii) at least one composition based on an aminoalkylsilane.

Suitably, the binder according to the invention contains, according to component (i), at least one organic resin from the series consisting of urea-formaldehyde resin (UF resin), phenol-formaldehyde resin (PF resin), tannin-formaldehyde resin (TF resin), melamine-formaldehyde resin (MF resin), diphenylmethane diisocyanate resin (PMDI resin) or at least one natural or near-natural binder from the series consisting of the proteins, in particular the animal or vegetable proteins, for example—but not exclusively—soybean proteins, corn proteins, wheat proteins—to mention but a few examples— the industrial lignins, the tannins, potato pulp or a mixture of at least one organic resin and at least one natural or near-natural binder. An example of such a mixture is melamine-reinforced urea-formaldehyde resin (MUF for short). Components according to (i) from the series consisting of UF, PF, TF, MF and PMDI resins are known per se and can be purchased as commercial products. Said natural or near-natural binders for component (i) are also known per se and as a rule are commercially available as such.

Binders according to component (i) are described in detail, for example, in "Enzyme von Weißfäulepilzen als Grundlage für die Herstellung von Bindemitteln für Holzwerkstoffe [Enzymes of white-rot fungi as a basis for the preparation of binders for wood-based materials]" by A. R. Kharazipour, Vol. 121, JD. Sauerländers Verlag, Frankfurt am Main, ISBM 3-7939-5124-3. The content of the above-mentioned citation is hereby incorporated in its entirety in the present description as a disclosure.

In addition, the type and preparation of potato pulp as a starting material for component (i) of the binder are disclosed, for example, in the patent applications EP 0 613 906 A1, DE 43 06 441 A1, DE 43 40 517 A1 or DE 43 45 418 A1.

Surprisingly, the components (i) and (ii) of the binder according to the invention are very compatible with one another and are miscible in any ratio.

In the present invention, the components (i) and (ii) can therefore advantageously be used as a mixture in any mixing ratio.

The use of a mixture is preferred, the component (ii) amounting to 0.01 to 100% by weight of the total binder system, in particular to 0.1 to 99.9% by weight, preferably those systems comprising from 0.2 to 50% by weight of component (ii), particularly preferably from 0.3 to 8% by weight, very particularly preferably from 0.5 to 3% by weight of component (ii), based in each case on the total binder composition.

In a binder according to the invention, component (i) is suitably present in an amount of from 0.1 to 99.9% by weight, preferably from 0.5 to 50% by weight, particularly preferably from 2 to 20% by weight, very particularly preferably from 3 to 15% by weight, in particular from 5 to 10% by weight, based in each case on the total binder composition.

Thus, a PF or UF resin in an amount of from 5 to 20% by weight, in particular from 10 to 15% by weight, based on the binder composition is preferred for component (i).

Furthermore, PMDI resin in an amount of from 2 to 15% by weight, based on the binder composition, is particularly preferred, in particular from 3 to 6% by weight.

Furthermore, the present binder may additionally contain a solvent or dispersant, such as water or alcohol—to mention but a few examples.

The sum of the respective components of an existing binder composition is 100% by weight.

Thus, binders according to the invention can advantageously be prepared in a simple and economical manner by combination of the components and subsequent thorough mixing. As a rule, a clear, colorless or brownish, readily mobile, i.e. low-viscosity, to viscous composition is thus obtained, such a composition generally being storage-stable over a period of 6 months or longer. Further components may also be added to such a system.

Thus, a binder according to the invention may advantageously contain at least one further component from the series consisting of the paraffin- or wax-based water repellents, the flameproofing agents, dyes or pigments, biocidal substances and fragrances, in addition to the components (i) and (ii) and a solvent or dispersant. Thus, already colored binders can advantageously be provided for the production of colored composite materials.

The present invention furthermore relates to a composite material comprising at least one cellulose- or lignocellulose-containing material and a binder, the binder being based at least on the components (i) and (ii) and
(i) being selected from the series consisting of organic resins, isocyanates, natural or near-natural binders and
(ii) being a composition which is based on at least one aminoalkylsilane compound of the formula (I) or at least one cocondensate which results from the reaction of at least one aminoalkylsilane of the general formula (I) and at least one further functional silane of the general formula (II).

A composite material according to the invention is advantageously characterized by at least one natural or near-natural cellulose- or lignocellulose-containing material from the series consisting of industrial wood, forestry industry timber, used or recycled wood, wood particles, woodchips, wood fibers, wood wool, wood dust, sawdusts, planing chips, cutting chips, slabs, veneer wastes, splinters, particle material from annual plants, e.g. hemp scrapings or cotton straw, or a mixture of at least two of the abovementioned materials, the cellulose- or lignocellulose-containing fiber material preferably originating from hardwood, softwood, palm fibers, e.g. coconut fibers, and annual plants, such as cereal straw, rice straw, cotton, jute or hemp, to mention but a few.

Furthermore, a composite material according to the invention is advantageously based on a binder which, according to component (ii), is based on at least one aminoalkylsilane of the formula (I)

in which groups $R^1$ and $R^2$ are identical or different and in each case are H or a linear, branched or cyclic $C_1$- to $C_{20}$-alkyl group or an aryl group or an aminocarbyl group, it being possible for groups $R^1$ and $R^2$ optionally to be substituted, $R^3$ is H or a linear or branched $C_1$- to $C_8$-alkyl group, groups $R^4$ are identical or different and $R^4$ is H or methyl, a is from 1 to 10, groups $R^4$ are identical or different and $R^4$ is H or a linear or branched $C_1$- to $C_8$-alkyl group and r is 0 or 1 or 2, or at least one cocondensate is based on at least one aminoalkylsilane of the general formula (I) and at least one further functional silane of the general formula (II)

in which $R^7$ is H or a vinyl group or an amino group or a glycidyloxy group or an acryloyloxy group or a methacryloyloxy group or a mercapto group or a sulfane group or a linear or branched $C_1$- to $C_{20}$-alkyl group or an aryl group, it being possible for the group $R^7$ to be optionally substituted, groups $R^6$ are identical or different and $R^6$ is H or methyl, b is from 0 to 18, $R^5$ is H or a linear or branched $C_1$- to $C_8$-alkyl group, groups R are identical or different and R is H or a linear or branched $C_1$- to $C_8$-alkyl group and p is 0 or 1 or 2, it being possible for the amino functions in the cocondensate to be partly or completely neutralized with an inorganic or organic acid, or on an aqueous solution which contains at least one aminoalkylsilane of the formula (I) or at least one cocondensate based on at least one aminoalkylsilane of the general formula (I) and at least one further functional silane of the general formula (II).

Such binders used according to the invention for existing composite materials can, according to component (ii), advantageously be based on an aqueous, substantially alcohol-free hydrolysis product of at least one aminoalkylsilane compound according to the formula (I) or on at least one cocondensate of the general formula (III), i.e. corresponding cocondensates of at least one aminoalkylsilane of the general formula (I) and at least one further functional silane of the general formula (II).

Such an alcohol-free hydrolysis product may have a pH of from 1 to 14, preferably from 3 to 12, particularly preferably from 4 to 10, and a viscosity of from 1 to 10 000 mPa·s, preferably of form 1 to 1000 mPa·s, at an active substance content of from 0.1 to 80% by weight, preferably from 1 to 80% by weight, particularly preferably from 10 to 60% by weight, based on the composition of the agent. The pH can be determined, for example, according to DIN 38404-5 and the viscosity, for example, according to DIN 53015.

A binder according to the invention and a composite material according to the invention are furthermore distinguished by an aminoalkylsilane compound of the formula (I) or at least one cocondensate based on at least one aminoalkylsilane of the general formula (I) and at least one further functional silane of the general formula (II), active substances according to component (ii) of the binder composition preferably having at least one aminoalkyl group from the series consisting of 3-aminopropyl, 3-amino-2-methylpropyl, N-(2-aminoethyl)-3-aminopropyl, N-(2-aminoalkyl)-3-amino-2-methylpropyl, N—[N'-(2-aminoethyl)-2-aminoethyl]-3-aminopropyl, N—[N'-(2-aminoethyl)-2-aminoethyl]-3-amino-2-methylpropyl, N,N-[di(2-aminoethyl)]-3-aminopropyl, N,N-[di(2-aminoethyl)]-3-amino-2-methylpropyl, N-(n-butyl)-3-aminopropyl, N-(n-butyl)-3-amino-2-methylpropyl, to mention but a few.

For a group according to $R^1R^2N(CHR^4)_a$— in the formula (I) or (III) groups from the series consisting of
$H_2N(CH_2)_3$—,
$H_2N(CH_2)_2NH(CH_2)_3$—,
$H_2N(CH_2)_2NH(CH_2)_2NH(CH_2)_3$— and

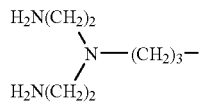

are particularly preferred.

A further preferred group $R^7(CHR^6)_b$— according to formula (II) or (III) is one from the series consisting of $CH_3$—, $(n)C_3H_7$—, $(i)C_3H_7$—, $(n)C_4H_9$—, $(i)C_4H_9$—, $(n)C_8H_{17}$—, $(i)C_8H_{17}$—, $(n)C_{16}H_{32}$—, $(i)C_{16}H_{32}$—, $(n)C_{18}H_{36}$—, $(i)C_{18}H_{36}$—, $H_2N(CH_2)_3$—, $H_2N(CH_2)_2NH(CH_2)_3$—, $H_2N(CH_2)NH(CH_2)_2NH(CH_2)_3$—, $[H_2N(CH_2)_2]_2N(CH_2)_3$—, $HS(CH_2)_3$—, $(H_3CO)_3Si(CH_2)_3$—$S_x$—$(CH_2)_3$— where x=1 to 10, preferably 2, 3, 4 or 5, $C_6H_5$—, $H_2C=C(CH_3)COO(CH_2)_3$— and

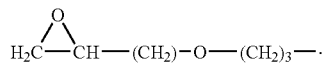

The present invention furthermore relates to a composite material which is obtainable by
treating dried or moist cellulose- or lignocellulose-containing material with
a binder according to the invention,
bringing the cellulose or lignocellulose material thus treated into a desired form and then hot-pressing it.

The so-called "absolutely dry wood mass" is determined as a rule by treating the cellulose- or lignocellulose-containing material at 103° C. to constant weight, in this context cf. DIN 53 183 and EN 322.

Moist cellulose- or lignocellulose-containing material, for example in the form of wood fibers, may have a wood moisture content (also referred to below as moisture content for short) of more than 100%, based on absolutely dry wood mass, after the industrial process of defibration in the so-called refiner. For example, freshly felled trunks have a moisture content of from 120 to 160%, depending on the tree species.

In the production of MDF by the so-called "blow line" process, the fiber material used is as a rule not dried prior to gluing but passes from the upstream defibration process still in the moist state directly into the blow line, in which the binder is added to the fibers. The fibers are only dried thereafter in the glued state. Preferably, a moisture content of about 10 to 14% is established and further processing to MDF is subsequently effected.

However, it is also possible to use already dried cellulose- or lignocellulose-containing material for the production of composite materials.

Thus, for example in the production of MDF by the blender process, dried fibers, preferably those having a moisture content of about 10 to 12%, are used. This material is as a rule glued in a mixer and then further processed to MDF. Here too an additional drying step, for example in a tubular dryer line, may follow the gluing step.

The use of already dried particles, in particular those having a moisture content of from 2 to 5%, is furthermore preferred in particleboard production. The drying of this material used is effected predominantly in a tube-bundle or rotary dryer.

The present invention also relates to a process for the production of a composite material according to the invention, by
treating dried or moist cellulose- or lignocellulose-containing material with
a binder according to the invention,
bringing the material thus treated into a desired form and then hot-pressing it.

For this purpose, it is possible to use the apparatuses or plants known per se for the production of composite materials, in particular wood-based materials, such as, for example, continuously operating Contiroll plants from Siempelkamp, Binos, Dieffenbacher or Metso, to mention but a few examples.

Suitable processes for the treatment of cellulose- or lignocellulose-containing material with a binder according to the invention are, for example, brushing, roll-coating, spraying, dipping, flooding, spraying, blowline gluing or gluing in the mixer (blender process with apparatuses from, for example, Lödige, Drais or Binos).

Thus, the cellulose- or lignocellulose-containing material can particularly advantageously be sprayed with a binder according to the invention in a rotating drum (circulation process, procedure preferably at room temperature or with cooling, for example at from 4 to 12° C., in particular at about 10° C.) by means of a gluing apparatus operated with compressed air, for example a gluing gun, which suitably has an operating pressure of from 0 to 4 bar abs. As a rule, a substantially uniformly glued material is obtained in this manner.

In the process according to the invention, the gluing can advantageously be carried out on a pilot or industrial scale, but also in a trough mixer, plowshare mixer or blender mixer and by the blowline process.

Furthermore, in the process according to the invention, the cellulose or lignocellulose material thus treated at ambient temperature can advantageously be scattered to give a cake, i.e. in particular a particle cake or mat, combed, and pressed at a temperature up to 250° C., preferably from 150 to 210° C., and a pressure up to 9 N/mm², preferably from 4 to 7 N/mm², and for a time of up to 300 s per mm of the desired board thickness, preferably from 5 to 60 s/mm, particularly preferably from 8 to 40 s/mm.

However, other shaped articles, for example extrudate or cuboid parts or special shaped articles, can also be produced from such a cake or from cellulose or lignocellulose material glued according to the invention.

However, an existing cake or glued material can also first be prepressed or precompacted, for example using a preliminary pressure of from 0.2 to 0.6 N/mm². In addition glued material, in particular a cake, can be preheated, for example to 60 to 80° C., before, during or after the prepressing, i.e. before the actual pressing. Such a thermal and/or mechanical pretreatment of the cake or of the glued material before the actual pressing step can advantageously contribute to substantial improvement of the subsequent product quality.

In addition the shaped articles obtained in the shaping or pressing step can advantageously be subjected to a postcondensation or aging. Thus, for example, boards can be subjected to storage in a stack. Frequency heating, for example by means of microwave technology, can additionally be carried out.

However, it is also possible to effect cooling, in particular in the case of composite materials based on UF resin, for example for from 20 to 30 minutes in a star cooling turner.

The postconditioning may additionally contribute toward simplification or uniformity in the composite materials.

Thus, after the cooling, composite materials according to the invention are obtained, in particular particleboards, fiberboards, ultralight fiberboards (ULF), light fiberboards (LDF), medium density fiberboards (MDF), high density fiberboards (HDF), OSB boards (OSB=oriented strand board), linear boards, plywood boards, wood pellets, wood briquettes and industrial construction material comprising wood, so-called "engineered wood", such as laminated strand lumber (LSL), parallel strand lumber (PSL) and laminated veneer lumber (LVL). Abovementioned composite materials suitably have a bulk density of from 150 to 1200 kg/m³. The bulk density can be determined, for example, according to the EN 323.

Nowadays, three raw material varieties in different proportions are used for obtaining the particles. About 57% of the required timber raw material are provided by industrial wood residues. Industrial wood residues are defined as timber wastes of the wood treatment and processing industry. These include sawdusts, planing chips, cutting chips and slabs, but also residual rolls of the veneer industry. About a further 23% of the timber raw material are obtained from forestry industry timber. This is the classical raw material in the form of harvested trunks, which are processed in the particleboard works to give woodchips or directly by means of longwood chippers to give particles. The third group of raw materials comprises used or recycled wood at about 20%. These are used products comprising solid wood, wood-based material or composite materials having a predominant proportion of wood content of more than 50% by mass. In the works particles having defined dimensions are produced from the various raw material varieties by means of knife ring chippers, longwood chippers and hammermills. After the particle material is present, it is as a rule dried to a moisture content of from 1.5 to 3% in tube-bundle or tubular drum dryers. This is followed by screening and classification, the particle material being separated into top and middle layer particle and possible coarse particle material. The particles of the top and middle layer fraction can then be fed for gluing and, for example, pressed to give particleboards.

In industrial fiber production, industrial wood residues are generally also used as raw material, in addition to forestry timber. The previously debarked forestry timber is comminuted together with the industrial wood residues in a chipper to give woodchips. These woodchips are digested by the "Asplund process" in steam at from 160 to 180° C. under a pressure of 8 to 12 bar. After this operation, the so-called plastification, the material enters a refiner. This consists of two counterrotating grinding disks between which the material is defibrated. A constant pressure of about 11 bar prevails in the refiner. Owing to the mild digestion conditions, the wood is subject to few chemical changes. This leads to a light color of the fiber thus provided and a high yield.

In general, lignocellulose is understood as meaning the matrix component which is formed by the three major chemical wood ingredients cellulose, hemicellulose and lignin. The incorporation of lignin (incrustation with lignin) leads as a rule to lignification of the cell wall and hence to improved mechanical stability and load-bearing capacity of terrestrial plants. Lignocellulose for use in the wood-based materials industry is obtained predominantly in the form of fibers or particles. For example, lignocellulose fibers can be obtained from hardwoods and softwoods. Furthermore, some annual plants, such as flax or hemp, also constitute a suitable source of lignocellulose fibers.

The fibers can be obtained, inter alia, by the Asplund process. There, the wood is first comminuted into woodchips and then digested at high temperatures and pressures and finally defibrated using a refiner (which consists of two counterrotating grinding disks).

For obtaining the chips, as a rule wood in the form of woodchip is fed to so-called knife ring chippers and chipped therein to give chips having defined dimensions.

In the process according to the invention, at least one natural or near-natural cellulose- or lignocellulose-containing material from the series consisting of industrial wood, forestry industry timber, used or recycled wood, wood shavings, woodchips, wood fibers, for example from pine wood, wood wool, wood dust, particles, such as sawdusts, planing chips or cutting chips, slabs, veneer wastes, splinters, particle material from annual plants, e.g. hemp scrapings or cotton straw, or a mixture of at least two or the abovementioned materials can advantageously be used.

In the process according to the invention a cellulose- or lignocellulose-containing material from plants from the series consisting of hardwood, softwood, coconut, in particular coconut fibers, cotton, flax scrapings, hemp scrapings, bargasse, jute, sisal, reed, rice straw or cereal straw is particularly preferably used.

Furthermore used in the process according to the invention is a binder according to the invention which, as component (ii), is preferably based on an aminoalkylsilane compound of the formula (I) from the series consisting of 3-aminopropyltrimethoxysilane, 3-aminopropyltriethoxysilane, 3-aminopropylmethyldimethoxysilane, 3-aminopropylmethyldiethoxysilane, 3-aminopropylsilanetriol, N-(2-aminoethyl)-3-aminopropyltrimethoxysilane, N-(2-aminoethyl)-3-aminopropyltriethoxysilane, N-(2-aminoethyl)-3-aminopropylsilanetriol, N—[N'-(2-aminoethyl)-2-aminoethyl]-3-aminopropyltrimethoxysilane, N—[N'-(2-aminoethyl)-2-aminoethyl]-3-aminopropyltriethoxysilane, N—[N'-(2-aminoethyl)-2-aminoethyl]-3-aminopropylsilanetriol, N,N-[di(2-aminoethyl)]-2-aminopropyltrimethoxysilane, N,N-[di(2-aminoethyl)]-2-aminopropyltriethoxysilane, N,N-[di(2-aminoethyl)]-2-aminopropylsilanetriol, N-(n-butyl)-3-aminopropyltrimethoxysilane, N-(n-butyl)-3-aminopropyltriethoxysilane, N-(n-butyl)-3-aminopropylsilanetriol, $(H_3CO)_3Si(CH_2)_3NH(CH_2)_3Si(OCH_3)_3$ (bis-AMMO), $(H_5C_2O)_3Si(CH_2)_3NH(CH_2)_3Si(OC_2H_5)_3$ (bis-AMEO), $(H_3CO)_3Si(CH_2)_3NH(CH_2)_2NH(CH_2)_2NH(CH_2)_3Si(OCH_3)_3$ (bis-DAMO), $(H_3CO)_3Si(CH_2)_3NH(CH_2)_2NH(CH_2)_2NH(CH_2)_2NH(CH_2)_3Si(OCH_3)_3$ (bis-TRIAMO) or a mixture of at least two of the abovementioned aminoalkylsilanes or an aqueous solution of at least one of the abovementioned aminoalkylsilane compounds.

For the preparation of an aminoalkylsilane-containing aqueous solution, as a rule a procedure is adopted in which water, preferably demineralized water, is mixed with the hydrolyzable aminoalkylsilane and, if appropriate, is allowed to react with gentle heating and stirring. Suitably from 0.001 to 999 parts by weight of at least one aminoalkylsilane compound according to formula (I) is used per 1 part by weight of water. Preferably from 0.1 to 90 parts by weight of an aminoalkylsilane according to formula (I), particularly preferably from 1 to 30 parts by weight, very particularly preferably from 5 to 15 parts by weight, in particular from 7 to 10 parts by weight, of an aminoalkylsilane according to formula (I) are used per 1 part by weight of water. In the reaction, oligomeric silanes may also form, at least proportionately. Furthermore, an organic or inorganic acid, for example formic acid, acetic acid, hydrochloric acid or phoshoric acid—to mention but a few—can be also be added to the mixture or the solution and pH can be adjusted preferably to 2 to 10. In addition the alcohol hydrolysis product can be distilled off from the composition after the hydrolysis if appropriate under reduced pressure. Aqueous, substantially alcohol-free solutions comprising virtually completely hydrolyzed aminoalkylsilane are obtained, the alcohol content preferably being less than 3% by weight, particularly preferably less than 1% by weight, very particularly preferably less than 0.5% by weight, in particular less than 0.1% by weight, i.e. being below the limit of detection for such systems. Thus, a generally clear and alcohol-free, aqueous aminoalkylsilane-containing solution can advantageously be prepared, for example DYNASYLAN® 1151 or 1154, and can be used as a binder for composite materials, in particular for wood-based materials.

In the process according to the invention, cocondensates which are preferably based on at least one silane of the general formula (II) from the series consisting of tetraethoxysilane, methyltrimethoxysilane, methyltriethoxysilane, n-propyltrimethoxysilane, n-propyltriethoxysilane, n-butyl- and isobutyltrimethoxysilane, n-butyl- and isobutyltriethoxysilane, n-octyl- and isooctyltrimethoxysilane, n-octyl- and isooctyltriethoxysilane, phenyltrimethoxysilane, phenyltriethoxysilane, vinyltrimethoxysilane, vinyltriethoxysilane, tridecafluoro-1,1,2,2-tetrahydrooctyltrimethoxysilane, tridecafluoro-1,1,2,2-tetrahydrooctyltriethoxysilane, 3-glycidyloxypropyltrimethoxysilane, 3-glycidyloxypropyltriethoxysilane, 3-methacryloyloxypropyltrimethoxysilane, 3-methacryloyloxypropyltriethoxysilane, 3-mercaptopropyltrimethoxysilane, 3-mercaptopropyltriethoxysilane and those aminosilanes disclosed according to formula (I) can also advantageously be used according to component (ii) of the binder according to the invention.

Said cocondensates according to component (ii) of the binder according to the invention, cf. in this context also formula (III) or the aqueous solution thereof, which are likewise advantageously used in the binder according to the invention, are as a rule obtainable by hydrolysis and condensation or cocondensation or block cocondensation of corresponding monomeric alkoxysilanes or chlorosilanes according to formula (I) as well as formula (II) by addition of an amount of water required to obtain the desired degree of oligomerization, for example DYNASYLAN® 2907, 2909 or F 8815. The procedure can be effected in the presence of a hydrolysis or condensation catalyst. The hydrolysis and condensation or cocondensation—including block cocondensation—can also be carried out in the presence of a diluent or solvent, preferably methanol, ethanol and/or isopropanol. As a rule alcohol or solvent is removed at least proportionately from the system after or during the reaction, and the system is diluted to the desired extent with water. In addition further components, for example additional acids, alcohol, monomeric organosilanes or monomeric cationic aminosilanes, can be added to the agent present. The preparation of corresponding systems and starting materials suitable for this purpose are, however, also disclosed in EP 0 716 127, EP 0 716 128, EP 0 846 717, EP 0 846 716, EP 1 031 593 and EP 1 101 787. The entire content of the patents mentioned here is incorporated in the present application to the full extent of the disclosure.

Compounds according to formula (III) may be proportionately or virtually completely hydrolyzed in aqueous systems. Furthermore, linear or cyclic silane oligomers according to formula (III) are preferably present, i.e. as a rule comparatively short-chain organosiloxanes which are substantially composed of M- and D-structures are present here. However, branched structures or three-dimensional structures, i.e. organosiloxanes according to formula (III) having T- or Q-structures, may also occur from time to time.

Binders used according to the invention preferably have, as component (ii) a content of active substance of from 0.5 to 95% by weight, particularly preferably from 2 to 40% by weight, very particularly preferably from 5 to 30% by weight, in particular from 5 to 20% by weight, based on the composition of component (ii).

Furthermore preferred according to the invention is a binder which contains from 0.9 to 3.6 mol of HCOOH or $H_3CCOOH$ per mole of amino groups in silane cooligomers, preferably from 1 to 1.1 mol of acid per mole of nitrogen of the amino functions.

Thus, compounds according to formula (III), i.e. cocondensates based on at least one aminoalkylsilane of the general formula (I) and at least one further functional silane of the general formula (II), and corresponding, as a rule clear and readily mobile solutions, for example DYNASYLAN® HS 2907, HS 2909 or F 8815, can advantageously be mixed in the desired ratio with water. It is also possible first to mix the abovementioned products or agents and then, if appropriate, to dilute them with water and/or alcohol. For example, a triaminoalkyl/tridecafluoro-1,1,2,2-tetrahydrooctyl/hydroxy- or alkoxysilane mixture substantially neutralized with acetic acid or formic acid or a 3-aminopropyl/isobutyl/hydroxy- or alkoxysiloxane mixture substantially neutralized with acetic acid can be mixed with water in the volume ratio of from about 1:0.5 to 0.5:5, preferably from about 1:1 to 0.5:2, in particular about 1:2.

According to the invention, a binder having a water content of from 5 to 99.5% by weight is preferably used; one comprising from 50 to 98% by weight of water is particularly preferred, very particularly preferably from 60 to 95% by weight, in particular from 80 to 95% by weight, based on the binder composition, the respective components of the agent summing to 100% by weight.

The component (ii) of the binder according to the invention can also have a content of free acid of <10% by weight, preferably from 0 to 7% by weight, particularly preferably from 0.001 to 5% by weight, based on the composition. In other words, acid fractions which are present as amino or ammonium salts are to be excluded here when stating the so-called free acid fractions.

Furthermore, component (ii) may contain alcohol, in particular methanol, ethanol, n-propanol, isopropanol, 2-methoxyethanol or a mixture thereof. However, binders which are alcohol-free are preferred i.e. free alcohol can be detected up to a limit of not more than 3% by weight in such an agent by customary methods, such as gas chromatography having a limit of detection of <0.1%.

In the process according to the invention as a rule the cellulose- or lignocellulose-containing material is sprayed with the binder in a pneumatically or hydraulically initiated gluing apparatus.

Binders or binder systems according to the invention are advantageously based on the following proportions of components. The data (% by weight) are based on the composition of the respective binder system.

| Binder system based on | Component (i) [% by weight] | Component (ii) [% by weight] |
| --- | --- | --- |
| UF resin | preferably 4-15 in particular 6-12 | preferably 0.1-6 in particular 0.5-3 |
| PF resin | preferably 3-15 in particular 5-12 | preferably 0.1-6 in particular 0.5-3 |
| PMDI resin | preferably 0.5-8 in particular 2-6 | preferably 0.1-6 in particular 0.5-3 |
| TF resin | preferably 4-15 in particular 5-12 | preferably 0.1-6 in particular 0.5-3 |
| Protein | preferably 5-20 in particular 8-15 | preferably 0.1-10 in particular 1-6 |
| Lignin | preferably 5-20 in particular 8-15 | preferably 0.1-10 in particular 1-6 |

Thus, in the process according to the invention, up to 70% by weight, preferably from 0.1 to 30% by weight, particularly preferably from 1 to 15% by weight, very particularly preferably from 3 to 12% by weight, in particular from 5 to 10% by weight, of binders according to the invention, based on absolutely dry cellulose or lignocellulose material, are used.

In addition, in the process according to the invention, a curing accelerator in an amount of up to 8% by weight, preferably from 0.01 to 7% by weight, for example aqueous solutions of potassium carbonate or ammonium sulfate, based on "absolutely dry binder", i.e. "solid binder", can be used in addition to the binder. "Solid binder" is to be understood as meaning the proportion if the binder according to the invention is treated according to EN 322 and the remaining residue (=solids content of the binder) is weighed.

Furthermore, in the present process, the cellulose or lignocellulose material thus treated can be scattered to give a cake, i.e. to give a particle cake or mat, combed, and pressed at a temperature up to 250° C., preferably from 150 to 210° C., and a pressure up to 9 N/mm$^2$, preferably from 4 to 7 N/mm$^2$, and for a time of up to 300 s per mm board thickness, preferably from 5 to 60 s/mm, particularly preferably from 8 to 40 s/mm.

In general, the present invention is carried out as follows:

Cellulose- or lignocellulose-containing material is treated with a binder according to the invention. If appropriate, further components are added to the material thus obtained and said material is introduced into a mold in a manner known per se and cured. For example the material thus obtained can be scattered on the surface of a hotpress, combed and hot-pressed. During this procedure, the cellulose- or lignocellulose-containing material reacts with the binder present and water evaporates.

Thus, composite materials according to the invention, in particular wood-based materials, can advantageously be produced using a binder according to the invention.

In particular, binders according to the invention are used for the production of particleboards, fiberboards, ultralight fiberboards, light fiberboards, medium density fiberboards, high density fiberboards, OSB boards, veneer boards, plywood boards, wood pellets, wood briquettes, "engineered wood", insulating materials, plant pots, for example from red-rotting spruce wood, moldings, for example—but not exclusively—moldings for automotive interior trim, i.e. an example of technical wood construction materials.

Thus, the special binder according to the invention is advantageously suitable in particular for the production of wood-based material having good mechanical-technological properties. The use of the novel binder in the production of composite materials based on cellulose or lignocellulose has for the first time opened up the possibility of producing wood-based material having mechanical-technological properties which meet the requirements of the relevant European standards (EN 622-5).

EXAMPLES

Example 1

UF Resin-Bound Medium Density Fiberboards 10 mm thick MDF having a required bulk density of 800 kg/m$^3$ were produced. The boards were pressed at 190° C. and 24 s/mm. The binder used was a standardized urea-formaldehyde condensate of the brand "Kaurit® 407 liquid" from BASF AG, having a solids content of 66%. The glue liquor for the reference test series (referred to as UF reference for short) consisted of 12% of solid resin, based on absolutely dry fiber, and 1%, based on absolutely dry fiber, of the water repellent "Hydrowax 730®" from SASOL WAX GmbH. The glue liquor test series in which a binder mixture comprising UF and DYNASYLAN® 1151 or a mixture of UF and DYNASYLAN® 1154 was used consisted of 12% of solid UF resin, based on absolutely dry fiber, and 1% of DYNASYLAN® 1151 (referred to as UF+1151 for short), based on absolutely dry fiber, or 1.2% of DYNASYLAN® 1154 (referred to as UF+1154 for short), based on absolutely dry fiber.

The results of this transverse tensile strength test are summarized in Table 1.

TABLE 1

Transverse tensile strengths of UF resin-bound MDF

| Designation | Transverse tensile strength (N/mm$^2$) | Change of transverse tensile strength compared with UF reference in % |
| --- | --- | --- |
| UF reference | 0.92 | — |
| UF-1151 | 1.21 | +32 |
| UF + 1154 | 1.16 | +26 |

It can be stated that the fiberboards of all test series meet the requirements of the EN 622-5 (MDF). However, the transverse tensile strength is substantially increased by addition of DYNASYLAN®. The transverse tensile strength could be increased by 32% in the case of an addition of DYNASYLAN® 1151 and by 26% in the case of an addition of DYNASYLAN® 1154. This increase in the strength can be used for saving UF resin.

Example 2

Wheat Protein-Bound Medium Density Fiberboards 10 mm thick MDF having a required bulk density of 800 kg/m$^3$ were produced. The boards were pressed at 190° C. for 24 s/mm. The binder used was an aqueous wheat protein product (WP) having a solids content of 41.5%. The glue liquors of the test series consisted of:

1. WP reference: 15% of solid resin, based on absolutely dry fiber, and 1% of water repellent of the brand "Hydrowax 730®" from SASOL WAX GmbH, based on absolutely dry fiber.
2. WP+1154 (0.6%): 15% solid resin, based on absolute dry fiber, and 0.6% of DYNASYLAN® 1154 from DEGUSSA AG, based on absolutely dry fiber.
3. WP+1154 (1.2%): 15% of solid resin, based on absolutely dry fiber, and 1.2% of DYNASYLAN® 1154 from DEGUSSA AG, based on absolutely dry fiber.
4. WP+1151 (1%): 15% of solid resin, based on absolutely dry fiber, and 1% of DYNASYLAN® 1151 from DEGUSSA AG, based on absolutely dry fiber.
5. WP+1151 (1%)+Hydrowax: 15% of solid resin, based on absolutely dry fiber and 1% of DYNASYLAN® 1151 from DEGUSSA AG, based on absolutely dry fiber, and 1% of water repellent of the brand "Hydrowax 730®" from SASOL WAX GmbH, based on absolutely dry fiber.
6. WP+2909 (1.3%): 15% of solid resin, based on absolutely dry fiber, and 1% of DYNASYLAN® HS 2909 from DEGUSSA AG, based on absolutely dry fiber.

The results of the transverse tensile strength and thickness swelling tests are shown in Table 2.

TABLE 2

Mechanical-technological properties of wheat protein-bound MDF

| Designation | Transverse tensile strength (N/mm$^2$) | Change of transverse tensile strength compared with reference (%) | Swelling after 24 h (%) | Change of swelling compared with reference (%) |
|---|---|---|---|---|
| WP reference | 0.48 | — | 86.39 | — |
| WP + 1154 (0.6%) | 0.58 | +21 | 47.57 | −45 |
| WP + 1154 (1.2%) | 0.68 | +42 | 38.40 | −56 |
| WP + 1151 (1%) | 0.53 | +10 | 62.85 | −27 |
| WP + 1151 (1%) + Hydrowax | 0.70 | +46 | 14.12 | −84 |
| WP + 2909 (1.3%) | 0.50 | +4 | 61.62 | −29 |

The results show that an addition of DYNASYLAN® leads in all test series to an increase in the transverse tensile strength and a reduction in the thickness swelling after storage in water for 24 hours. The fiberboards of the test series WP+1154 (1.2%) and WP+1151 (1%)+Hydrowax also fulfill EN 622-5 (MDF) with regard to the parameter transverse tensile strength, which is stated as 0.60 N/mm$^2$ in the standard. The fiberboards of the test series WP+1151 (1%)+Hydrowax also give results below the parameter thickness swelling of EN 622-5 (MDF), which is stated as not more than 15% in the standard. For these reasons, it is clear that the use of DYNASYLAN® creates the possibility of producing wheat protein-bound medium density fiberboards which are comparable with conventionally bound MDF in their mechanical-technological properties. This would not be possible without an addition of organofunctional silanes.

Example 3

Potato Pulp-Bound Medium Density Fiberboards 10 mm thick MDF having a required bulk density of 800 kg/m$^3$ were produced. The boards were pressed at 190° C. for 30 s/mm. The binder used was a mechanically enzymatically digested potato pulp (KP) having a solids content of about 17% (cf. EP 0 613 906 A1). The glue liquors or the test series consisted of:

1. KP reference: 15% of solid resin, based on absolutely dry fiber, and 1% of water repellent of the brand "Hydrowax 730®" from SASOL WAX GmbH, based on absolutely dry fiber.
2. KP+1154 (0.6%)+Hydrowax (1%): 15% of solid resin, based on absolutely dry fiber, 0.6% of DYNASYLAN® 1154 from DEGUSSA AG, based on absolutely dry fiber, and 1% of water repellent of the brand "Hydrowax 730®" from SASOL WAX GmbH, based on absolutely dry fiber.
3. FP+1154 (1.2%)+Hydrowax (2%): 15% of solid resin, based on absolutely dry fiber, 1.2% of DYNASYLAN® 1154 from DEGUSSA AG, based on absolutely dry fiber, and 2% of water repellent of the brand "Hydrowax 730®" from SASOL WAX GmbH, based on absolutely dry fiber.

The results of the material testing are shown in Table 3:

TABLE 3

Mechanical-technological properties of potato pulp-bound MDF

| Designation | Transverse tensile strength (N/mm$^2$) | Change of transverse tensile strength compared with reference(%) | Swelling after 24 h (%) | Change of swelling compared with reference (%) |
|---|---|---|---|---|
| KP reference | 0.38 | — | 73.15 | — |
| KP + 1154 (0.6%) + Hydrowax (1%) | 0.50 | +32 | 47.49 | −35 |
| KP + 1154 (1.2%) + Hydrowax (2%) | 0.64 | +68 | 14.25 | −81 |

Here, it may be stated that an addition of DYNASYLAN® can substantially increase the transverse tensile strength and substantially reduce the thickness swelling. The fiberboards of test series KP+1154 (1.2%)+Hydrowax (1%) meet the requirements of EN 622-5 (MDF) with regard to the above-mentioned parameters.

Example 4

Phenol-Formaldehyde Resin-Bound Three-Layer Particleboards 20 mm thick three-layer particleboards having a required bulk density of 700 kg/m$^3$ and a standardized glue liquor were produced from the industrial particle materials. The binder used for the top layer gluing was an aqueous solution of phenol-formaldehyde resin condensate of the brand "Bakelite 2506 HW®" from BAKELITE AG, having a solids content of 47%. The aqueous solution of a phenol-formaldehyde resin condensate of the brand BAKELITE 1842 HW® from BAKELITE AG, having a solids content of 46%, was used for the middle layer gluing. A 50% strength potassium carbonate solution was used as a curing accelerator. DYNASYLAN® 1151 and DYNASYLAN® 1154 from DEGUSSA AG were used as amino-functional silane components.

The glue liquor of the top layer consisted of 10% of solid PF resin, based on absolutely dry particles, and 0.5% of DYNASYLAN® 1151 (referred to as PF+1151 for short) or DYNASYLAN® 1154 (referred to as PF+1154 for short), based on absolutely dry particles. The glue liquor of the middle layer consisted of 7.5% of solid resin, based on absolutely dry particles, 6% of potassium carbonate solution, based on absolutely dry solid resin, and 0.5% of DYNASYLAN® 1151 (PF+1151) or DYNASYLAN® 1154 (PF+1154), based on absolutely dry particles. The glue liquor for the reference particleboards (PF reference) was prepared without addition of DYNASYLAN®.

The particleboards were pressed in an electrically heated single-daylight press at 210° C. and for a pressing time of 15 s/mm.

The results of the transverse tensile strength and 24 hour water storage test of the test series are shown in Table 4.

TABLE 4

Mechanical-technological properties of the PF resin-bound three-layer particleboards

| Designation | Transverse tensile strength (N/mm$^2$) | Change of transverse tensile strength compared with reference (%) | Swelling after 24 h (%) | Change of swelling compared with reference (%) |
|---|---|---|---|---|
| PF reference | 0.69 | — | 20.88 | — |
| PF + 1151 | 0.87 | +26 | 18.09 | −13 |
| PF + 1154 | 0.79 | +14 | 19.57 | −6 |

The particleboards of all test series fulfill EN 312-4 with regard to transverse tensile strength. The particleboards which were produced using said DYNASYLAN® additives in the glue liquor, however, also meet the requirements of EN 312-7 (0.70 N/mm$^2$) for high-strength boards for load-bearing purposes for use in humid regions.

Example 5

Urea-Formaldehyde-Bound Three-Layer Particleboards 20 mm thick three-layer particleboards having a required bulk density of 700 kg/m$^3$ and a standardized glue liquor were produced. The binder used was the aqueous solution of a urea-formaldehyde condensate of the brand "KAURIT® 350 liquid" from BASF AG, having a solids content of 68%. The curing accelerator used was a 33% strength ammonium sulfate solution. For the reference boards (referred to as UF reference for short), the glue liquor of the top layer comprised 11% of solid resin, based on absolutely dry particles, and 0.5% of ammonium sulfate solution, based on absolutely dry solid resin. The medium layer glue liquor comprised 8.5% of solid resin, based on absolutely dry particles, and 2% of ammonium sulfate solution, based on absolutely dry solid resin.

The glue liquors of the other test series consisted of the same composition for the top layer as for the reference particleboards. The glue liquor of the middle layer for the test series UF+1151 comprised 8.5% of solid resin, based on absolutely dry particles, 2% of ammonium sulfate solution, based on absolutely dry solid resin, and 0.5% of DYNASYLAN® 1151, based on absolutely dry particles. The middle layer glue liquor of the test series UF+1154 comprised 8.5% of solid resin, based on absolutely dry particles, and 0.9% of DYNASYLAN® 1154, based on absolutely dry particles.

The particleboards were pressed at 195° C. with a pressing time of 12 s/mm. The results of the transverse strength measurement are shown in Table 5.

TABLE 5

Transverse tensile strengths of UF resin-bound particleboards

| Designation | Transverse tensile strength (N/mm$^2$) | Change of transverse tensile strength compared with reference (%) |
|---|---|---|
| UF reference | 0.67 | — |
| UF + 1151 | 0.78 | +13 |
| UF + 1154 | 0.80 | +16 |

The specifications of EN 312-4 were surpassed by the particleboards of the test series. However, only the test series of the particleboards which were produced with DYNASYLAN® in the glue liquor fulfill the specifications of EN 312-7 (0.70 N/mm$^2$) for high-strength boards for load-bearing purposes for use in humid regions.

Example 6

UF Resin/Wheat Protein-Bound Three-Layer Particleboards 20 mm thick three-layer particleboards having a required bulk density of 700 kg/m$^3$ and a combination binder were produced. This binder consisted of 60% (based on solid constituents) of UF resin of the brand "Kaurit 345® liquid" from BASF AG and 40% (based on solid constituents) of a wheat protein binder.

The glue liquor of the reference series (UF/WP reference) was composed of 11% solid resin, based on absolutely dry particles, and 1%, based on absolutely dry particles, of water repellent of the brand "HYDROWAX 138®" from SASOL WAX GmbH, having a solids content of 50%, for the top layer. In the middle layer, 8.5% of solid resin were added to absolutely dry particles and 1% of the water repellent "HYDROWAX® 138", based on absolutely dry particles.

The glue liquor of the test series with a corresponding DYNASYLAN® proportion (UF/WP+1154) was composed of 11% of solid resin, based on absolutely dry particles, 0.6% of DYNASYLAN® 1154, based on absolutely dry particles, for the top layer. 8.5% of solid resin, based on absolutely dry particles and 0.6% of DYNASYLAN® 1154, based on absolutely dry particles, were used for the middle layer.

The particleboards were pressed at 195° C. with a pressing time of 19.5 s/mm. The results of the transverse strength and thickness swelling tests are shows in Table 6.

TABLE 6

Transverse tensile strengths of three-layer particleboards which are bound by means of a binder combination of UF resin and wheat protein

| Designation | Transverse tensile strength (N/mm$^2$) | Change of transverse tensile strength compared with reference (%) |
|---|---|---|
| UF/WP reference | 0.31 | — |
| UF/WP + 1154 | 0.63 | +103 |

A substantial improvement in the transverse tensile strength of the test series which was prepared using DYNASYLAN® 1154 in the glue liquor is found in comparison with the reference series without addition of DYNASYLAN®. The averaged value for the transverse tensile strength of the test series UF/WP+1154, 0.64 N/mm$^2$, is substantially above the minimum value of EN 312-4 (0.35 N/mm$^2$). The particleboards of this test series can also meet the requirements of EN 312-6 (0.50 N/mm$^2$) for high strength boards for load-bearing purposes for use in dry regions.

Example 7

Viscosity Investigations

The determination of the viscosity was carried out using a portable rotational rheometer from PHYSICA of the type "PHYSICA-RHEOLAP® MCI". A standard cylinder measuring system according to DIN 53019, of the type Z3, was employed. DYNASYLAN® was added to various conventional and near-natural binders. A commercial UF resin (UF) of the brand "KAURIT® 350 liquid" from BASF AG, having a solids content of 68%, and a commercial PF resin (PF) of the brand "HW 1842®" from BAKELITE AG, having a solids content of 46% were used as conventional binders. A wheat protein having a solids content of 41.5% was used as a near-natural binder. Furthermore, a 38% strength kraft lignin binder, which was produced from a kraft lignin powder (indulin) from WESTVACO, and a 39% strength tannin binder, which was produced from a tannin GTM powder.

For carrying out the test, in each case 200 g of binder were weighed into a 2000 ml beaker. Thereafter, the calculated amount of DYNASYLAN® was added while stirring at speed 1.5 using a laboratory stirrer. After stirring for 5 minutes, about 20 g of the sample were introduced into the standard cylinder measuring system up to the mark and the viscosity measurement was begun after a waiting time of 1 minute. During the measurement the temperature in the rotational rheometer was kept constant at 23° C. (±0.2° C.) by means of a connected thermostat.

The silane addition was effected on the basis of the solids content of the binder (DYNASYLAN® solid, based on solid binder).

The stated viscosity was determined at a shear rate of 500 $s^{-1}$ and is listed in Tables 7 to 17.

TABLE 7

Urea-formaldehyde resin K 350 with addition of DYNASYLAN ® 1151

| Designation | Silane addition | Viscosity (mPa · s) | % of reference without silane addition |
| --- | --- | --- | --- |
| UF reference | 0% | 728 | 100 |
| UF + 1151 (1%) | 1% | 691 | 95 |
| UF + 1151 (2%) | 2% | 658 | 90 |
| UF + 1151 (3%) | 3% | 614 | 84 |
| UF + 1151 (5%) | 5% | 555 | 76 |
| UF + 1151 (7%) | 7% | 447 | 61 |
| UF + 1151 (10%) | 10% | 226 | 31 |

TABLE 8

Urea-formaldehyde resin K 350 with addition of DYNASYLAN ® 1154

| Designation | Silane addition | Viscosity (mPa · s) | % of reference without silane addition |
| --- | --- | --- | --- |
| UF reference | 0% | 728 | 100 |
| UF + 1154 (1%) | 1% | 501 | 69 |
| UF + 1154 (2%) | 2% | 422 | 58 |
| UF + 1154 (3%) | 3% | 365 | 50 |
| UF + 1154 (5%) | 5% | 256 | 35 |
| UF + 1154 (7%) | 7% | 219 | 30 |
| UF + 1154 (10%) | 10% | 143 | 20 |

TABLE 9

Urea-formaldehyde resin K 350 with addition of DYNASYLAN ® HS 2907

| Designation | Silane addition | Viscosity (mPa · s) | % of reference without silane addition |
| --- | --- | --- | --- |
| UF reference | 0% | 603 | 100 |
| UF + 2907 (1%) | 1% | 577 | 96 |
| UF + 2907 (2%) | 2% | 477 | 79 |
| UF + 2907 (3%) | 3% | 430 | 71 |
| UF + 2907 (5%) | 5% | 359 | 60 |
| UF + 2907 (7%) | 7% | 308 | 51 |
| UF + 2907 (10%) | 10% | 248 | 41 |

TABLE 10

Urea-formaldehyde resin K 350 with addition of DYNASYLAN ® HS 2909

| Designation | Silane addition | Viscosity (mPa · s) | % of reference without silane addition |
| --- | --- | --- | --- |
| UF reference | 0% | 603 | 100 |
| UF + 2909 (1%) | 1% | 575 | 95 |
| UF + 2909 (2%) | 2% | 504 | 84 |
| UF + 2909 (3%) | 3% | 529 | 88 |
| UF + 2909 (5%) | 5% | 485 | 80 |
| UF + 2909 (7%) | 7% | 408 | 68 |
| UF + 2909 (10%) | 10% | 348 | 58 |

It may be stated that all four DYNASYLAN® types investigated contribute toward a substantial viscosity reduction of a commercial UF resin. The DYNASYLAN® products of the type 1151 and 1154 were found to have a particularly viscosity-reducing effect. In the case of DYNASYLAN® 1154, the silane addition of 3% was sufficient to halve the viscosity, cf. Table 8.

TABLE 11

Soluble wheat protein concentrate with addition of DYNASYLAN ® 1151

| Designation | Silane addition | Viscosity (mPa · s) | % of reference without silane addition |
| --- | --- | --- | --- |
| WP reference | 0% | 348 | 100 |
| WP + 1151 (1%) | 1% | 276 | 79 |
| WP + 1151 (2%) | 2% | 271 | 78 |
| WP + 1151 (3%) | 3% | 249 | 72 |
| WP + 1151 (5%) | 5% | 224 | 64 |
| WP + 1151 (7%) | 7% | 195 | 56 |
| WP + 1151 (10%) | 10% | 191 | 55 |

TABLE 12

Soluble wheat protein concentrate with addition of DYNASYLAN ® 1154

| Designation | Silane addition | Viscosity (mPa · s) | % of reference without silane addition |
| --- | --- | --- | --- |
| WP reference | 0% | 347 | 100 |
| WP + 1154 (1%) | 1% | 348 | 100 |
| WP + 1154 (5%) | 5% | 341 | 98 |
| WP + 1154 (7%) | 7% | 281 | 81 |
| WP + 1154 (10%) | 10% | 215 | 62 |

TABLE 13

Soluble wheat protein concentrate with addition of DYNASYLAN ® HS 2907

| Designation | Silane addition | Viscosity (mPa · s) | % of reference without silane addition |
|---|---|---|---|
| WP reference | 0% | 480 | 100 |
| WP + 2907 (3%) | 3% | 420 | 88 |
| WP + 2907 (5%) | 5% | 387 | 81 |
| WP + 2907 (7%) | 7% | 366 | 76 |
| WP + 2907 (10%) | 10% | 325 | 68 |

TABLE 14

Soluble wheat protein concentrate with addition of DYNASYLAN ® HS 2909

| Designation | Silane addition | Viscosity (mPa · s) | % of reference without silane addition |
|---|---|---|---|
| WP reference | 0% | 480 | 100 |
| WP + 2909 (2%) | 2% | 423 | 88 |
| WP + 2909 (3%) | 3% | 385 | 80 |
| WP + 2909 (5%) | 5% | 353 | 74 |
| WP + 2909 (7%) | 7% | 353 | 74 |
| WP + 2909 (10%) | 10% | 306 | 64 |

An addition of DYNASYLAN® to a wheat protein binder also led to a substantial reduction of the viscosity. In the investigations, DYNASYLAN® 1151 was found to have a particularly viscosity-reducing effect. A viscosity reduction of about 20% was observable on addition of from 1 to 2% of the organofunctional silane (cf. Table 11).

TABLE 15

Kraft lignin binder (indulin) with addition of DYNASYLAN ® 1151

| Designation | Silane addition | Viscosity (mPa · s) | % of reference without silane addition |
|---|---|---|---|
| Kraft lignin reference | 0% | 229 | 100 |
| Kraft lignin + 1151 (1%) | 1% | 229 | 100 |
| Kraft lignin + 1151 (2%) | 2% | 202 | 88 |
| Kraft lignin + 1151 (3%) | 3% | 167 | 73 |
| Kraft lignin + 1151 (5%) | 5% | 168 | 73 |
| Kraft lignin + 1151 (7%) | 7% | 94 | 41 |
| Kraft lignin + 1151 (10%) | 10% | 72 | 31 |

It was found that an addition of DYNASYLAN® 1151 also leads to a significant viscosity reduction of a kraft lignin binder (cf. Table 15). In particular, a silane addition in the range of from 7 to 10% led to a reduction of the viscosity by about 59 to 69%.

TABLE 16

Phenol-formaldehyde Bakelite HW 1842 ® with addition of DYNASYLAN ® 1151

| Designation | Silane addition | Viscosity (mPa · s) | % of reference without silane addition |
|---|---|---|---|
| PF resin reference | 0% | 723 | 100 |
| PF + 1151 (1%) | 1% | 502 | 69 |
| PF + 1151 (2%) | 2% | 324 | 45 |
| PF + 1151 (3%) | 3% | 227 | 31 |
| PF + 1151 (5%) | 5% | 147 | 20 |
| PF + 1151 (7%) | 7% | 90 | 12 |
| PF + 1151 (10%) | 10% | 54 | 7 |

In Table 16, it is clear that even a small addition of DYNASYLAN® 1151 (1%) leads to a very considerable viscosity reduction. Owing to this fact, it appears possible to synthesize PF resins having a higher solids content. To date, it has been possible to prepare phenol resins only with solid constituents of the order of magnitude of about 46%. This is still below the solids contents of the present-day urea-formaldehyde condensates, which have about 68% of solid constituents in the binder.

TABLE 17

Tannin binder GTM with addition of DYNASYLAN ® 1151

| Designation | Silane addition | Viscosity (mPa · s) | % of reference without silane addition |
|---|---|---|---|
| Tannin reference | 0% | 723 | 100 |
| Tannin + 1151 (2%) | 2% | 324 | 45 |

Tannins are very similar to the synthetically prepared phenol resins with regard to their chemical composition. It is therefore also not surprising that a tannin binder is also very positively influenced in its flow behavior by the addition of a small proportion of DYNASYLAN® 1151, which is manifested in a greatly reduced viscosity in the shear rate range considered.

The investigations regarding the viscosity change by admixing existing DYNASYLAN® systems have shown that not only is it possible to change a binder in its flow behavior by aminofunctional silane systems so that it is better processible from the point of view of application technology, but it also appears possible to increase the solids content, in particular of PF resins and near-natural binders. In practice, an increased solids content promises positive properties with regard to reduction of press times in combination with energy saving. Furthermore, transportation of binders would be better utilized since the proportion of solvent in the binder would be lower.

The invention claimed is:

1. A binder for a composite material comprising cellulose- or lignocellulose-containing material, the binder comprising an aqueous solution of:
   (i) 5-50% by weight of a natural binder selected from the group consisting of a wheat protein, a tannin, and potato pulp, and
   (ii) 0.1 to 10% by weight of a substantially alcohol-free hydrolysis product of a cocondensate consisting of one or more aminoalkylsilanes of formula (I)

$$R^1R^2N(CHR^4)_aSi(R^3)_r(OR)_{3-r} \quad (I),$$

wherein
   $R^1$ and $R^2$ are each independently H or an optionally substituted linear, branched or cyclic $C_1$- to $C_{20}$-alkyl group or an aryl group or an aminocarbyl group,
   $R^3$ is H or a linear or branched $C_1$-$C_8$-alkyl group, groups $R^4$ are each independently H or methyl,
   a is from 1 to 10, groups
   R are each independently a linear or branched $C_1$- to $C_8$-alkyl group, and
   r is 0 or 1 or 2,
   wherein
   the amino functions are neutralized with from 0.9 to 3.6 mol of HCOOH or $H_3$CCOOH per mole of amino group, and
   a content of (i) and (ii) in the aqueous binder solution is from 1 to 80% by weight.

2. The binder according to claim 1, further comprising a component selected from the group consisting of a paraffinor wax-based water repellent, a flameproofing agent, a biocidal substance and a fragrance.

3. The binder according to claim 1, wherein the natural binder is a wheat protein.

4. The binder according to claim 3, wherein the amount of wheat protein is 8-15% by weight and the amount of the aminoalkylsilane cocondensate is 1-6% by weight.

5. The binder according to claim 1, wherein the natural binder is a tannin.

6. The binder according to claim 1, wherein the natural binder is a potato pulp.

7. A composite material comprising at least one cellulose- or lignocellulose-containing material and the binder according to claim 1.

8. A composite material according to claim 7, comprising at least one natural or near-natural cellulose- or lignocellulose-containing material from the series consisting of industrial wood, forestry industry timber, used or recycled wood, wood particles, woodchips, wood fibers, wood wool, wood dust, sawdusts, planing chips, cutting chips, slabs, veneer wastes, splinters, particle material from annual plants, or a mixture of at least two of the abovementioned materials.

9. A composite material according to claim 7, the cellulose- or lignocellulose-containing fiber material originating from hardwood, softwood, palm fibers and annual plants.

* * * * *